United States Patent [19]

Phillips

[11] Patent Number: 5,000,270
[45] Date of Patent: Mar. 19, 1991

[54] TOOL ASSEMBLY

[76] Inventor: Laurence C. Phillips, P.O. Box 44, Merredin, Western Australia, Australia, 6415

[21] Appl. No.: 294,552
[22] PCT Filed: Jun. 26, 1987
[86] PCT No.: PCT/AU87/00183
  § 371 Date: Dec. 20, 1988
  § 102(e) Date: Dec. 20, 1988
[87] PCT Pub. No.: WO88/00002
  PCT Pub. Date: Jan. 14, 1988

[30] Foreign Application Priority Data

Jun. 27, 1986 [AU] Australia .............................. PH6619

[51] Int. Cl.⁵ ...................... A01B 21/04; A01B 23/02
[52] U.S. Cl. ................................. 172/540; 172/612; 172/753
[58] Field of Search ............... 172/518, 540, 548, 612, 172/749, 753, 543, 545, 177, 189; 56/400

[56] References Cited

U.S. PATENT DOCUMENTS

| 250,242 | 11/1881 | Haxton ................... 172/612 |
| 291,869 | 1/1884 | Bostwick ................ 172/545 X |
| 389,593 | 9/1888 | Parmiter ................. 172/612 |
| 2,825,983 | 3/1958 | Finn ........................ 172/540 X |
| 2,912,055 | 11/1959 | Buddingh et al. . | |
| 3,126,865 | 3/1964 | Wiegardt, Jr. ........... 172/612 X |
| 3,310,122 | 3/1967 | Mack ....................... 172/612 X |
| 4,582,142 | 4/1986 | Bridge ..................... 172/34 |

FOREIGN PATENT DOCUMENTS

| 2067383 | 5/1984 | Australia . |
| 5434286 | 9/1986 | Australia . |
| 75928 | 3/1919 | Austria ................... 172/612 |
| C619214 | 9/1935 | Fed. Rep. of Germany . |
| 637283 | 10/1936 | Fed. Rep. of Germany . |
| 1165330 | 3/1964 | Fed. Rep. of Germany . |
| 1179752 | 10/1964 | Fed. Rep. of Germany . |
| 3039548 | 5/1982 | Fed. Rep. of Germany . |
| A903722 | 1/1945 | France . |
| 378151 | 4/1973 | U.S.S.R. .................. 172/545 |
| 720674 | 12/1954 | United Kingdom ......... 172/612 |

OTHER PUBLICATIONS

"Chain Diker", article, Agricultural Engineering, Jul.-/Aug. 1989, pp. 12-15.
Banhazi et al., Filed Implements, 1978.

Primary Examiner—Randolph A. Reese
Assistant Examiner—Jeffery L. Thompson
Attorney, Agent, or Firm—Harness, Dickey & Pierce

[57] ABSTRACT

An elongated ground working tool (12) adapted to be supported at each end in a frame of a ground working implement for rotation about the longitudinal axis of the tool. The toll includes a multitude of tool elements (21) arranged in a plurality of groups (23) in the longitudinal direction of the tool. Each group (23) of tool elements (21) inter-engage with the next adjacent group of form flexible connections between the groups that will permit tensioning of the tool in the longitudinal direction when supported for rotation. The tool elements (21) are so constructed that when the groups of tool elements are inter-engaged and the tool longitudinally tensioned, each group of tool elements presents a plurality of prongs (27) spaced about and projecting outwardly with respect to the longitudinal axis of the tool. A tool element and a ground working implement are also described and claimed.

24 Claims, 10 Drawing Sheets

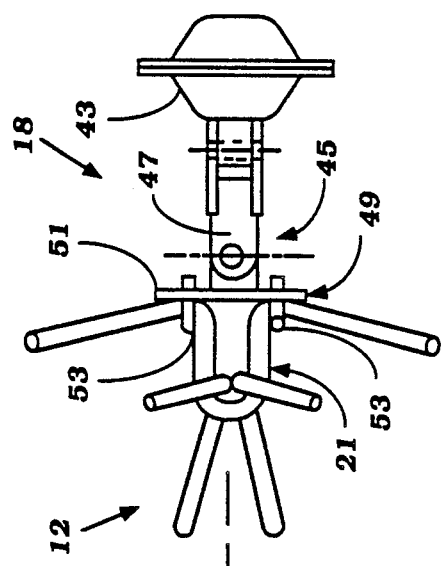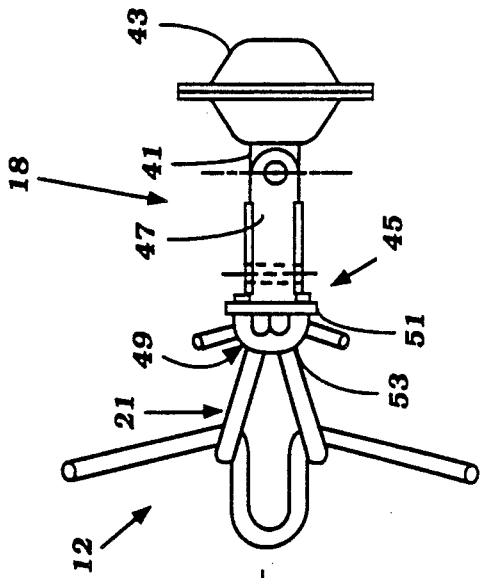
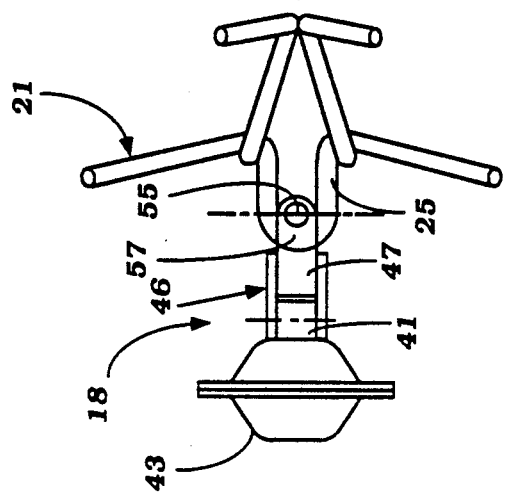
Figure 9
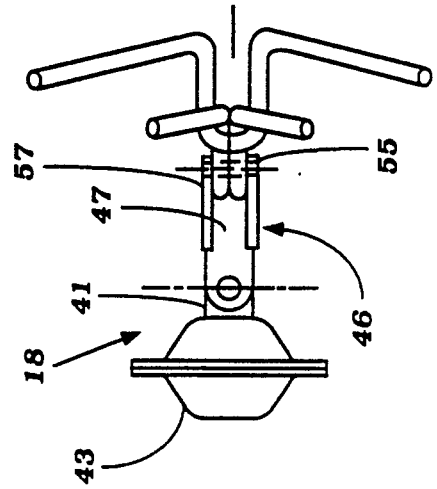
Figure 10

TOOL ASSEMBLY

This invention relates to a ground working tool and to a tool element for such a ground working tool.

It is known in agriculture to provide a ground working tool in the form of a so-called prickle chain which consists of a chain with projecting metal fingers welded along the length of the chain, preferably with at least one finger on each chain link. The prickle chain is rotatably supported at its ends in such a manner as to allow the chain to rotate when it is dragged in a generally sideways direction across the ground. The rotating action of the chain works the ground for tilling, secondary cultivation, ground levelling, trash removal and/or other ground working operations.

A prickle chain has the disadvantage that it is awkward and time consuming to construct owing to the fact that the fingers have to be welded onto the chain links at a variety of angular positions along the length of the chain.

The present invention seeks to provide a novel and useful ground working tool which is similar in some respects to a prickle chain but which can be constructed in a convenient manner. The invention also seeks to provide a tool element for such a ground working tool.

In one form the invention resides in an elongated ground working tool adapted to be supported at each end to rotate about the longitudinal axis thereof, said tool including a multitude of tool elements arranged in a plurality of groups in the longitudinal direction of the tool, each group of tool elements inter-engaging with the next adjacent group to form flexible connections between the groups that will permit tensioning of the tool in the longitudinal direction when supported for rotation, said tool elements being adapted so that when the groups of tool elements are inter-engaged and the tool longitudinally tensioned, each group of tool elements presents a plurality of prongs spaced about and projecting outwardly with respect to the longitudinal axis of the tool.

Preferably, the prongs of one group of tool elements are spaced in the longitudinal direction of the tool from the prongs of the next adjacent group of tool elements.

Preferably, each tool element includes a portion extending generally in said longitudinal direction, one prong from each of two tool elements of one group extending through an opening or respective openings in said longitudinal portion of a tool element of the next adjacent group, each prong in each one group of tool elements extending through a respective longitudinal portion of a tool element of the next adjacent group of tool elements to provide the flexible connection between the groups of tool elements.

Preferably, each tool element comprises a loop portion and a pair of fingers projecting from the loop portion, the loop portion defining said longitudinal portion of the tool element and the fingers defining said prongs.

Preferably, there are two or three tool elements in each tool group.

Preferably, the loop portion of each tool element is substantially U-shaped having a pair of arms and a base bridging the arms.

Preferably, the arms of each loop occupy a common plane and the fingers extend in generally opposing directions to the same side of said plane.

Preferably, each finger is provided with an abutting portion adjacent the loop portion, the abutting portion being arranged to abut a similar portion of a finger of a further similar tool element in the same group of tool elements.

In another form, the invention resides in a tool element constructed as set forth in any one of the preceding paragraphs.

Each tool element may be formed from a length of metal which has been bent or otherwise deformed to form the loop portion and the two fingers. In another arrangement, the tool elements may be forged.

In still another form the invention resides in a ground working implement to be drawn or propelled over ground to be worked and including a rigid frame, an elongated ground working tool as defined in any one of the preceding paragraphs supported at each end by said frame for rotation about the longitudinal axis of the tool, said support being arranged so said longitudinal axis of the tool is inclined to the direction of movement of the frame over the ground when in use.

Preferably, the ground working implement is provided with means to adjust the tension of the tool when supported in the implement frame.

The invention will be better understood by reference to the following description of three specific embodiments thereof as shown in the accompanying drawings in which:

FIG. 9 is a fragmentary plan view illustrating the tool according to the first embodiment supported between support means which form part of a ground working implement;

FIG. 10 is an elevational view of FIG. 9;

Figure 1:
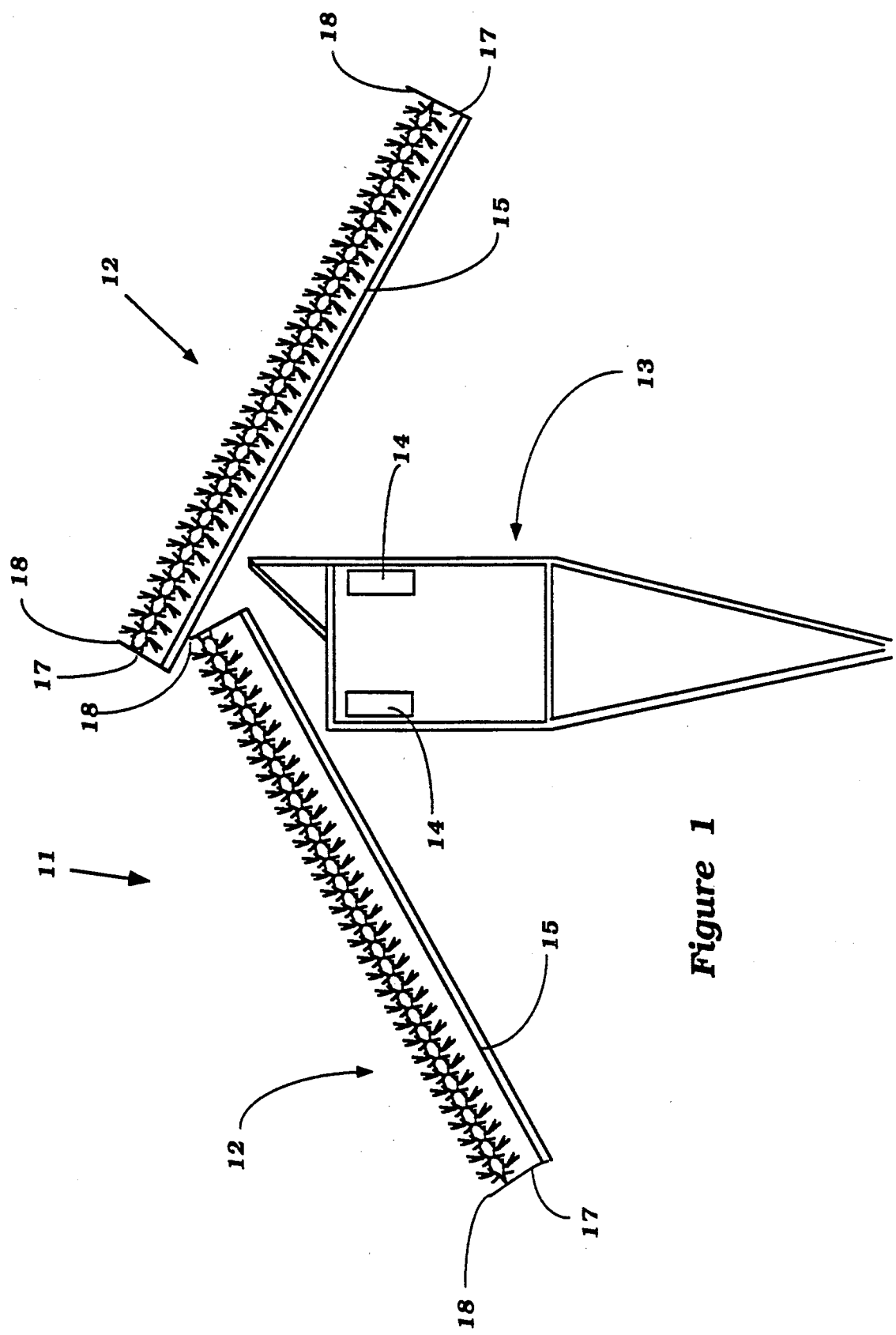
FIG. 1 is a schematic plan view of an agricultural implement fitted with two ground working tools according to the first embodiment.
Figure 2:
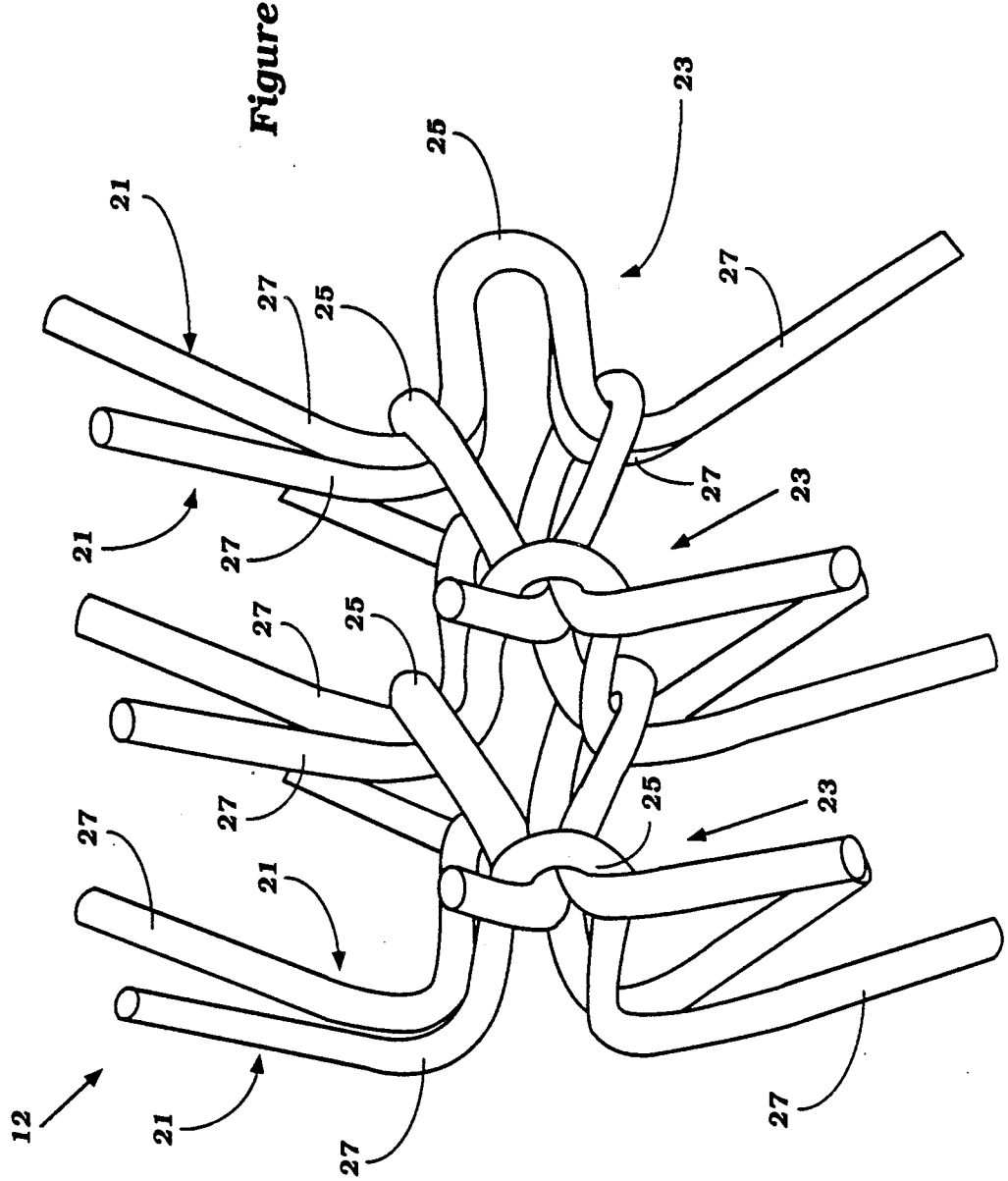
FIG. 2 is a perspective view of a section of one of the ground working tools according to the first embodiments, the section comprising several tool groups.

Referring to FIG. 1 of the drawings, there is shown a ground working implement 11 fitted with two elongated ground working tools 12 according to the first embodiment. The ground working implement 11 includes a mobile frame 13 which is supported on ground wheels 14 and which is adapted to be drawn by a tractor or other towing vehicle (not shown). The mobile frame 13 includes a pair of support beams 15 each of which is inclined to the direction of travel of the implement. At the ends of each beam 15 there are rearwardly extending members 17 each of which carries a support means 18. Each ground working tool 12 is supported at its ends by the support means 18 on a respective one of the beams 15 for rotation about the longitudinal axis of the tool.

Each ground working tool comprises a plurality of tool elements 21 arranged in a series of groups 23, there being two tool elements in each group in this embodiment. Each group of tool elements inter-engages with the next adjacent group to form flexible connections between the groups that will permit tensioning of the tool in the longitudinal direction when supported for rotation by the frame 13.

Each tool element 21 comprises a loop portion 25 and a pair of fingers 27. When the groups of tool elements are inter-engaged and the tool longitudinally tensioned, the fingers 27 define prongs which are spaced about and project outwardly with respect to the longitudinal axis of the tool.

The loop portion 25 of each tool element is substantially U-shaped having two spaced arms 29 and a base 31 which bridges the arms. The fingers 27 extend one from the free end of each arm 29 of the loop portion. The two arms 29 of each loop portion occupy a common plane and the fingers 27 deviate from that plane to one side thereof. Each finger 27 includes an abutting portion 35 at the inner end thereof. The abutting portion 35 is arranged to butt against a corresponding abutting portion of a similar tool in the same group of tools, as will become evident later.

Conveniently, each tool element is formed from a length of metal rods which has been bent or otherwise deformed to form the loop portion and the two fingers. Of course, each tool element may be formed by any other suitable means, such as forging.

Figure 3:
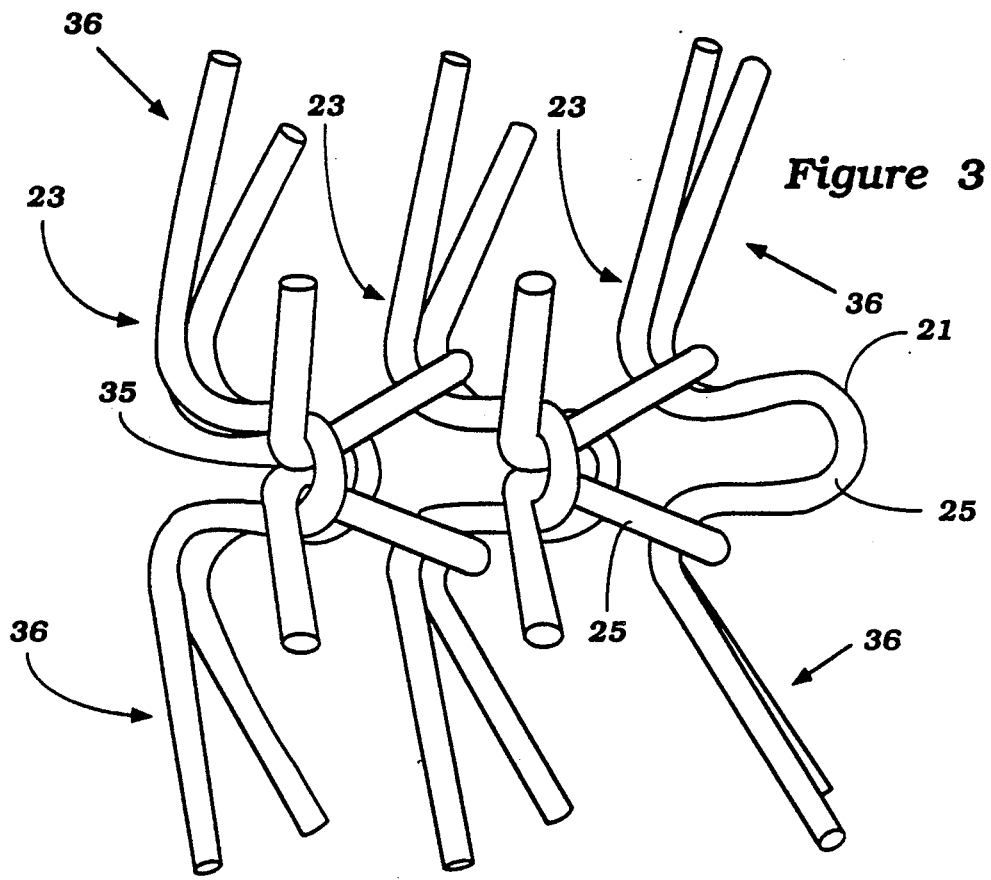
FIG. 3 is a side view of a section of the tool shown in FIG. 2.
Figure 4:
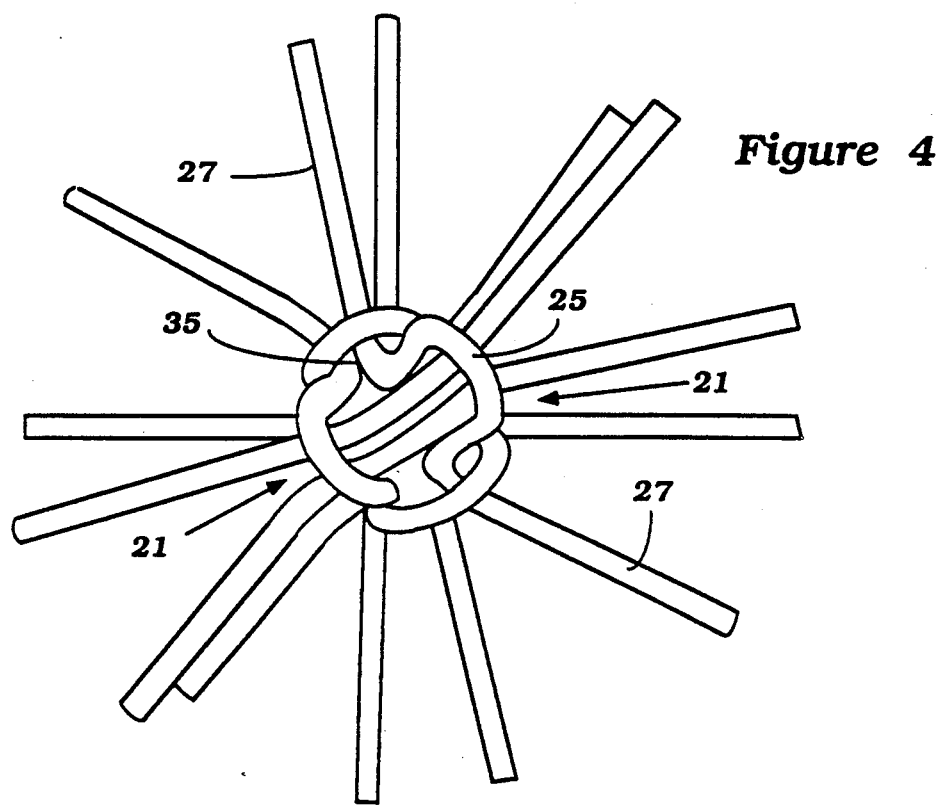
FIG. 4 is an end view the section of the tool shown in FIG. 2.
Figure 5:
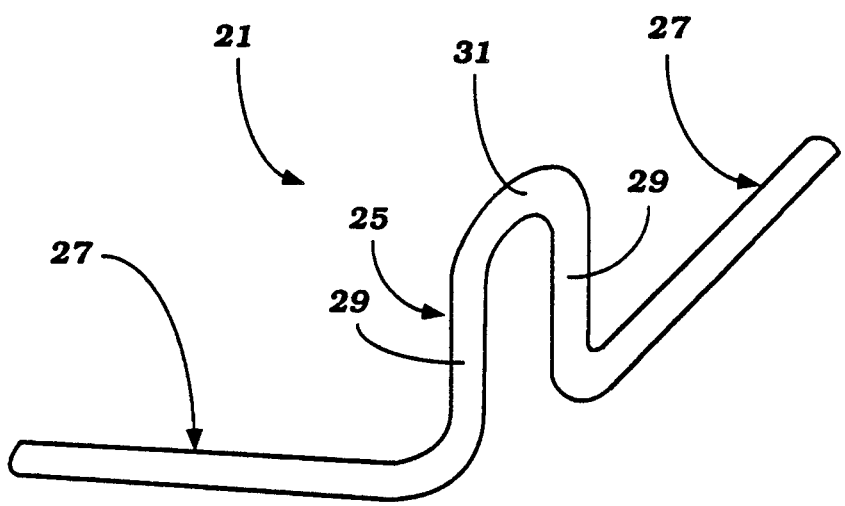
FIG. 5 is a perspective view of a tool element for the ground working tool according to the first embodiment.
Figure 7:
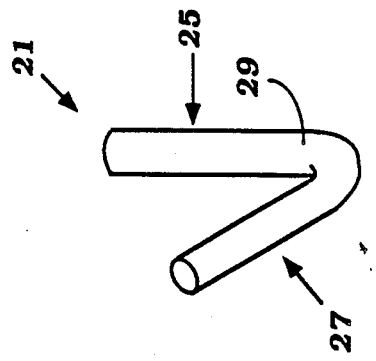
FIG. 7 is a side view of the tool element of FIG. 5.
Figure 6:
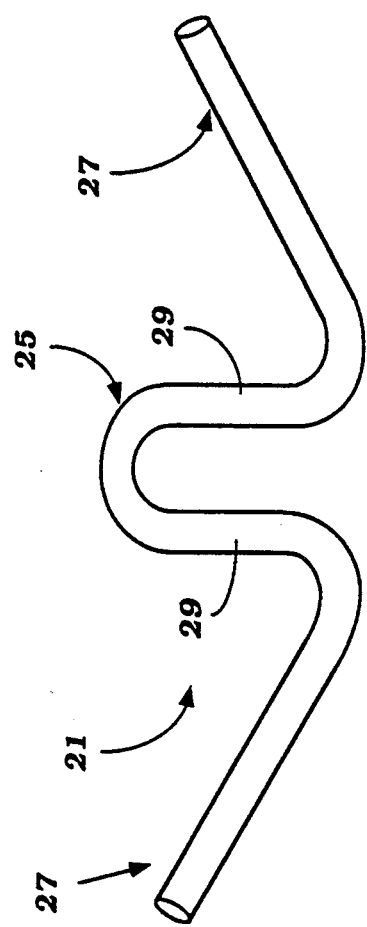
FIG. 6 is an elevational view of the tool element of FIG. 5
Figure 8:
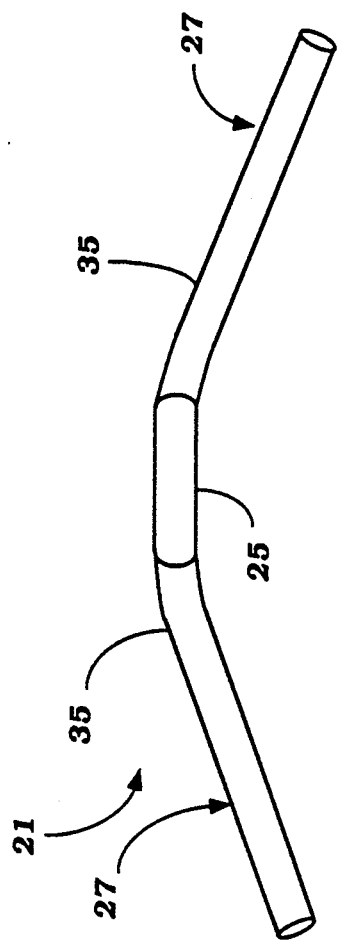
FIG. 8 is a plan view of the tool element of FIG. 5.
Figure 12:
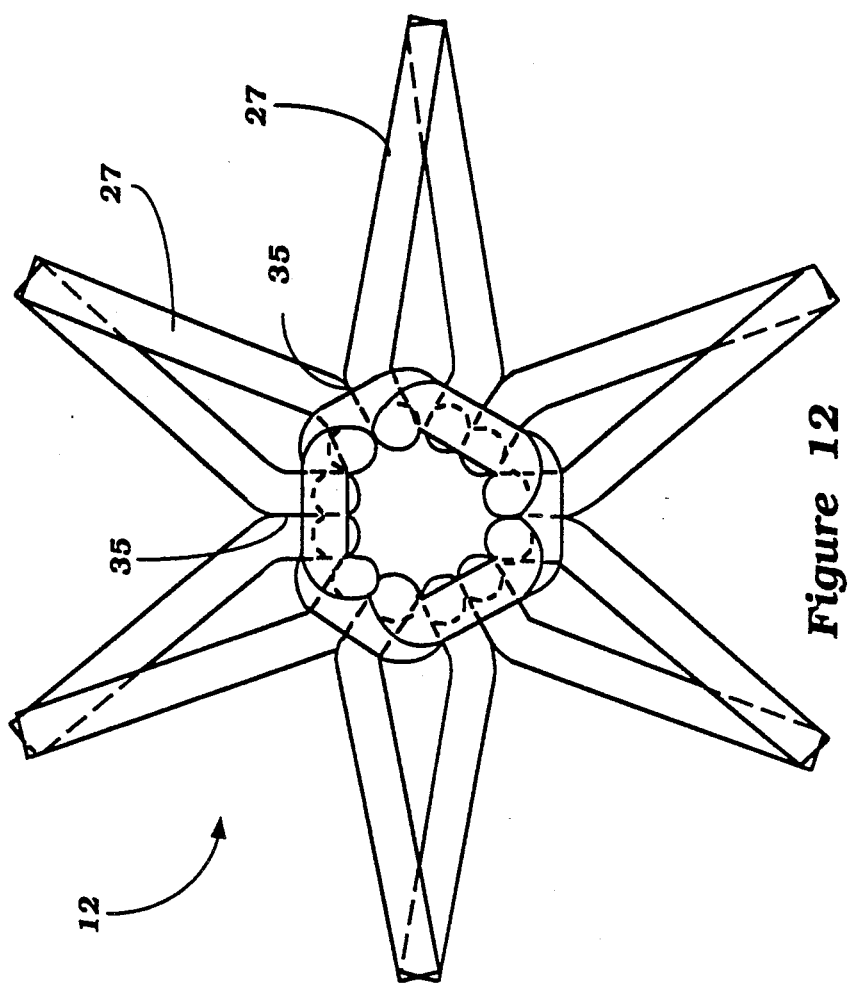
FIG. 12 is an end view of the section of tool assembly shown in FIG. 11.
Figure 11:
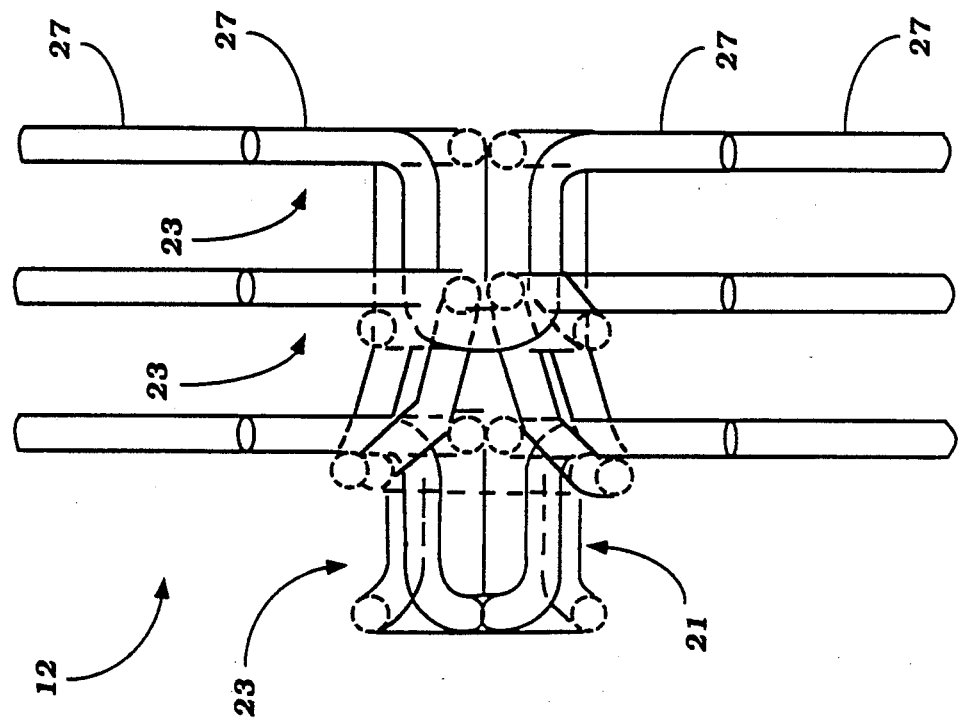
FIG. 11 is an elevational view of a section of a tool according to a second embodiment.
Figure 13:
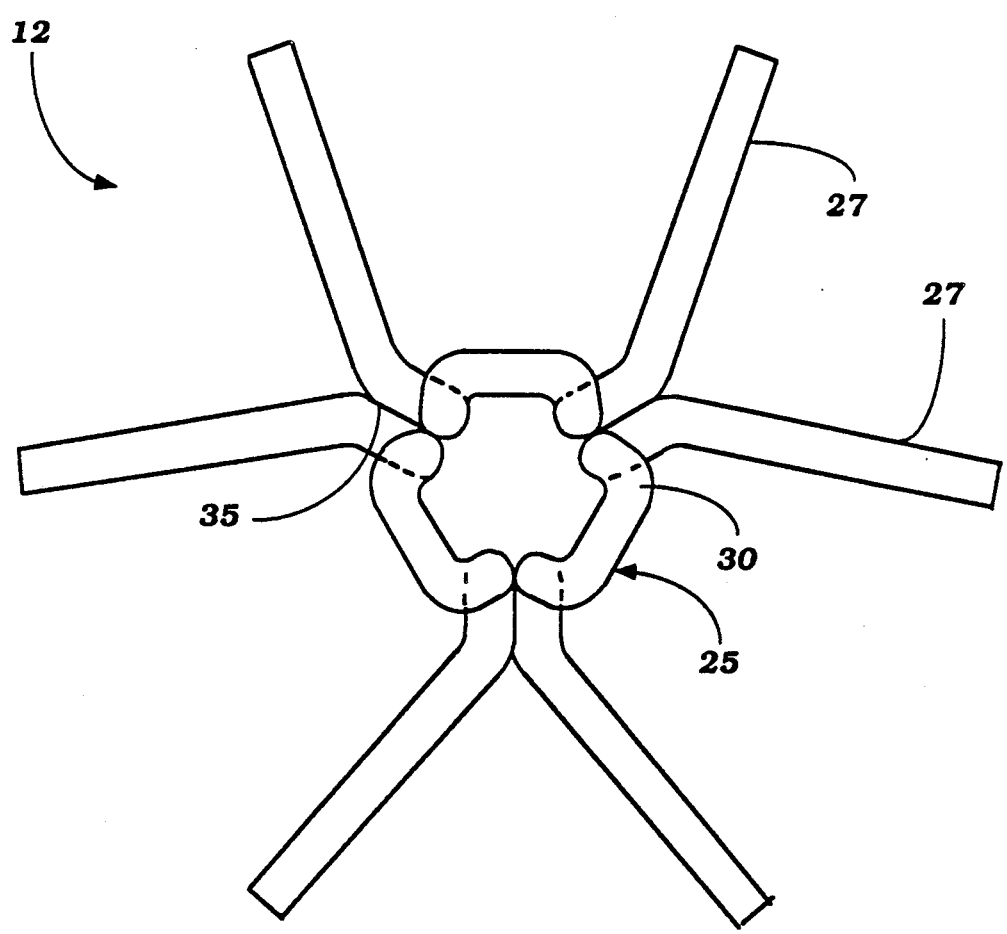
FIG. 13 is a view similar to FIG. 12 with the exception that only the tools in the endmost group are illustrated.
Figure 15:
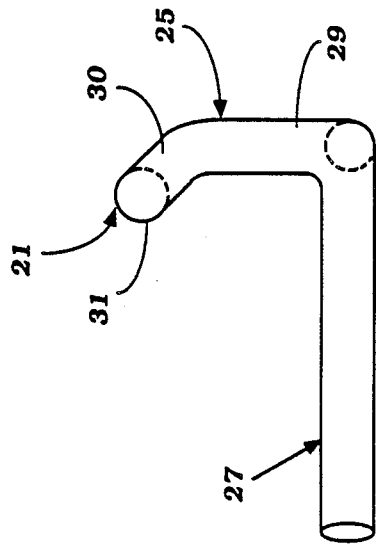
FIG. 15 is a side view of the tool element of FIG. 11.
Figure 16:
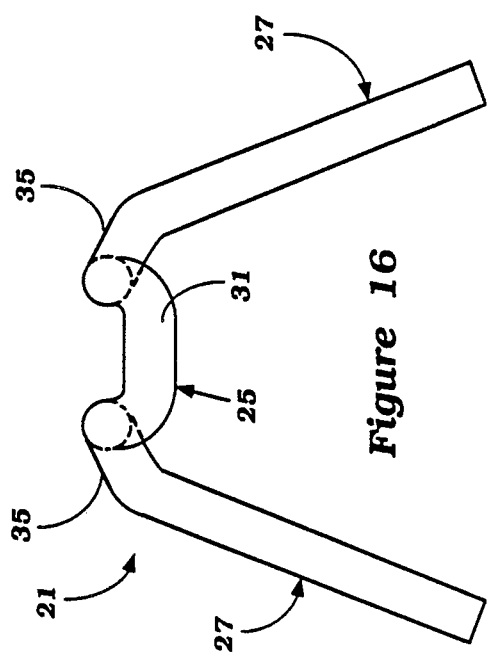
FIG. 16 is a plan view of the tool element of FIG. 11.
Figure 14:
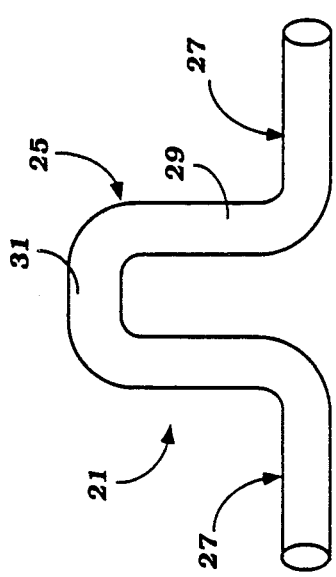
FIG. 14 is an elevational view of a tool element for the tool of FIG. 11.

As mentioned hereinbefore, the tool elements are connected together in a series of groups, with each group having two tool elements. In this way, each group provides four projecting prongs. The two tool elements of each group are positioned with their abutting portions 35 in contact, as best seen in FIGS. 3 and 4. This has the effect of locating the fingers 29 in pairs 36, one finger of each pair being from each tool element in the group. Apart from the tool group at one end of the tool, the loop portion 25 of each tool element 21 receives one pair of fingers from a neighbouring tool group, with the fingers being held captive between the arms of the loop and the base. The arrangement is such that the inner ends of the fingers are received in the loop portion, the fingers being inserted into the loop portion through the open end of the U.

Tensioning of the ground working tool 12 in the longitudinal direction ensures that the tool elements remain connected together. The tool elements of each group are held in position by virtue of their connection with the two neighbouring groups. More specifically, the finger pairs of the two tools in any group are held in position by the loop portions of tools in one neighbouring tool group and the loop portions of the tools in the first-mentioned tool group are held in position by the fingers of the other neighbouring group.

The tool 12 is constructed from the tool elements 21 merely by connecting the tool elements together in the manner described hereinbefore.

As stated previously, each tool 12 is mounted at its ends on support means 18 for rotation about the longitudinal axis of the tool. Referring now to FIGS. 9 and 10 of the accompanying drawings, each support means 18 includes a shaft 41 rotatably supported adjacent one end in a bearing (not shown) enclosed within a housing 43. The housing 43 is mounted on the implement frame 13 and the shaft extends from the housing in cantilever fashion. The respective end of the tool 12 is detachably connected to the free end of the shaft by way of a coupling means 45, 46 which includes a universal joint 47. The universal joint accommodates angular misalignment between the longitudinal axis of the tool 12 and the axis of rotation of the shaft 41.

As the tool group at one end of the tool 12 has the loop portions of the two tool elements endmost and the tool group at the other end of the tool has fingers endmost, the coupling means 45 and 46 differ in construction. The coupling means 45 includes a clamping means 49 which clampingly engage the fingers of the tool elements at the respective end of the tool. The clamping means 49 comprises a clamping plate 51 and a pair of U-bolts 53 between which the fingers are clamped. The coupling means 46 includes a transverse pin 55 supported by a yoke 57. The pin 55 is located in the loop portions of the tool elements at the respective end of the tool thereby to effect attachment of the loop portions to the coupling means.

Figure 17:
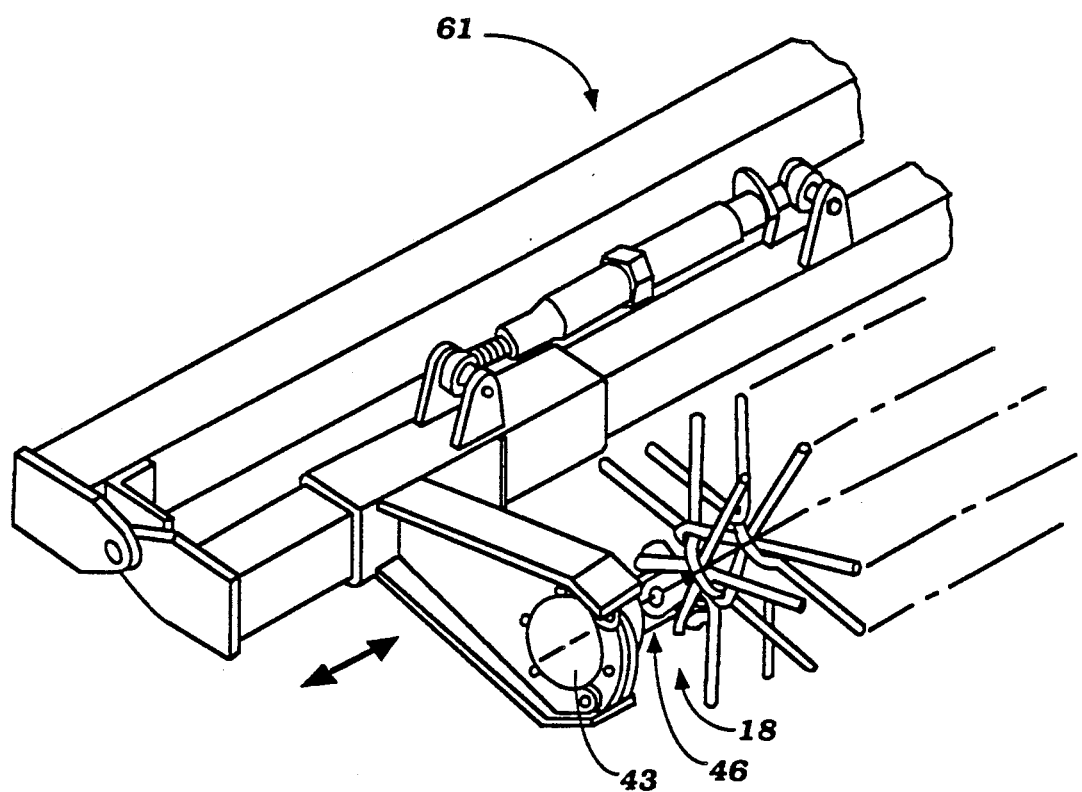
FIG. 17 shows the means for adjusting the tension of the tool.

Means 61 are provided for selectively varying the spacing between the support means 18 to adjust the tension of the ground working tool when supported in the frame of the ground working implement, as illustrated in FIG. 17. In this embodiment such means include a slide mechanism which supports one of the support means 18 for selective movement towards and away from the other support means. In an alternative arrangement, the spacing between the support means 18 can be varied by variation of the effective length of the support beam.

In use, each ground working tool 12 is mounted on the mobile frame 13 with the tool assembly at ground level. As the mobile frame traverses the grounds, the tool 12 is dragged in a generally sideways direction over the ground surface and this causes the tool to rotate. The rotating action of the tool causes the prongs to work the ground. The flexible nature of the interconnection between the respective groups of tool elements allows the tool to work uneven ground and also serves to relieve stresses in the tool.

Referring now to FIGS. 11 to 16 of the drawings, the tool according to the second embodiment is similar to that of the first embodiment with an exception that each tool group consists of three tools instead of two tools. Because of the similarity between the two embodiments, like reference numerals are used to identify like parts. Likewise, because of the similarity between the two embodiments, it will not be necessary to describe the third embodiment in full. A distinguishing feature between the tool elements of the first embodiment and the tool elements of the second embodiment is the inclination of the abutting portions 35 relative to the plane of the arms of the loop portion of each tool element. It will be appreciated that the abutting portions have to be suitably angled to accommodate a group of three tools rather than a group of two tools. A further distinguishing feature is that each arm 29 of the loop portion has a bent portion 30 adjacent the base 31. The bent portions 30 of the two arms serve to offset the base 31 from the plane of the two arms. This feature ensures that the respective base portions 31 of the tool elements in each group do not interfere with each other which the tool elements are in position in the group.

While the frame 13 illustrated in FIG. 1 of the drawings is suitable for supporting an elongated ground working tool according to the invention, an alternative frame construction has been devised which is particularly, although not solely, for such a purpose. The alternative frame construction is disclosed in Australian patent application No. PH07649 in the name of Farmers Tractors Australia Limited. The disclosure of Australian patent application No. PH07649 is incorporated herein by way of reference.

It should be appreciated that the scope of the invention is not limited to the scope of the embodiments described. For instance, a tool assembly according to the embodiment may be formed with groups of tools with more than three tools in each group if desired.

The claims defining the invention are as follows:

I claim:

1. An elongated ground working tool adapted to be supported at each end to rotate about the longitudinal axis thereof, said tool including a multitude of tool elements arranged in a plurality of groups in the longitudinal direction of the tool, each group of tool elements inter-engaging with the next adjacent group to form flexible connections between the groups that will permit tensioning of the tool in the longitudinal direction when supported for rotation, said tool elements being adapted so that when the groups of tool elements are inter-engaged and the tool longitudinally tensioned, each group of tool elements presents a plurality of prongs spaced about and projecting outwardly with respect to the longitudinal axis of the tool and wherein each tool element includes a portion extending generally in said longitudinal direction, one prong from each of two tool elements of one group extending through an opening or respective openings in said longitudinal portion of a tool element of the next adjacent group, each prong in said one group of tool elements extending through a respective longitudinal portion of a tool element of the next adjacent group of tool elements to provide the flexible connection between the groups of tool elements.

2. An elongated ground working tool as claimed in claim 1 wherein the prongs of one group of tool elements are spaced in the longitudinal direction of the tool from the prongs of the next adjacent group of tool elements.

3. An elongated ground working tool according to claim 1 wherein each tool element comprises a loop portion and a pair of fingers projecting from the loop portion, the loop portion defining said longitudinal portion of the tool element and the fingers defining said prongs.

4. An elongated ground working tool according to claim 3 wherein the loop portion of each tool element is substantially U-shaped having a pair of arms and a base bridging the arms.

5. An elongated ground working tool according to claim 4 wherein one finger extends from the free end of each arm of the U-shaped loop portion.

6. An elongated ground working tool according to claim 5 wherein the arms of each loop occupy a common plane and the fingers extend in generally opposing directions to the same side of said plane.

7. An elongated ground working tool according to claim 6 wherein each loop portion receives its respective fingers at the region thereof adjacent the inner end of the fingers.

8. An elongated ground working tool according to claim 3 wherein each finger is provided with an abutting portion adjacent the loop portion, the abutting portion being arranged to abut a similar portion of a finger of a further similar tool element in the same group of tool elements.

9. A ground working implement to be drawn or propelled over ground to be worked and including a rigid frame, an elongated ground working tool as claimed in claim 1 supported at each end by said frame for rotation about the longitudinal axis of the tool, said support being arranged so said longitudinal axis of the tool is inclined to the direction of movement of the frame over the ground when in use.

10. A ground working implement as claimed in claim 9 wherein means are provided to adjust the tension of the tool when supported in the implement frame.

11. An elongated ground working tool formed of a plurality of tool elements interlocked without any connecting means in a series of groups to form a chain like structure the ends of which are connected to a support in such a way as to enable the chain like structure to rotate, each group comprising at least two tool elements and each tool element comprising a loop portion and a pair of fingers projecting from the loop portion.

12. A tool according to claim 11 wherein the loop portion of each tool element which in the longitudinal direction of the chain like structure has a neighboring group on the loop side receives two fingers one from each of two tool elements in a neighboring tool group to retain the series of tool groups together.

13. An elongated ground working tool adapted to be supported at each end to rotate about the longitudinal axis thereof, said tool including a multitude of tool elements arranged in a plurality of groups in the longitudinal direction of the tool, each group of tool elements inter-engaging with the next adjacent group to form flexible connections between the groups that will permit tensioning of the tool in the longitudinal direction when supported for rotation, each group of tool elements presenting a plurality of prongs spaced about and projecting outwardly with respect to the longitudinal axis of the tool, characterized in that each tool element includes a loop shaped portion extending generally in said longitudinal direction and defining an opening, one prong from each of two tool elements of one group extending through said opening in said loop-shaped portion of a tool element of the next adjacent group to provide the flexible connection between the groups of tool elements.

14. An elongated ground working tool as claimed in claim 13 wherein the prongs of one group of tool elements are spaced in the longitudinal direction of the tool from the prongs of the next adjacent group of tool elements.

15. An elongated ground working tool as claimed in claim 13 wherein each tool element further includes a pair of fingers projecting from the loop portion, said fingers defining said prongs.

16. An elongated ground working tool as claimed in claim 15 wherein the loop portion of each tool element is substantially U-shaped having a pair of arms and a base bridging the arms.

17. An elongated ground working tool as claimed in claim 16 wherein one finger extends from the free end of each arm of the U-shaped loop portion.

18. An elongated ground working tool as claimed in claim 17 wherein the arms of each loop occupy a common plane and the fingers extend in generally opposing directions to the same side of said plane.

19. An elongated ground working tool as claimed in claim 16 wherein each loop portion receives its respective fingers at the region thereof adjacent the inner end of the fingers.

20. An elongated ground working tool as claimed in claim 15 wherein each finger is provided with an abutting portion adjacent the loop portion, the abutting portion being arranged to abut a similar portion of a finger of a further similar tool element in the same group of tool elements.

21. A ground working implement to be drawn or propelled over ground to be worked and including a rigid frame, an elongated ground working tool as claimed in claim 13 supported at each end by said frame for rotation about the longitudinal axis of the tool, said frame being arranged so said longitudinal axis of the tool is inclined to the direction of movement of the frame over the ground when in use.

22. A ground working implement as claimed in claim 21 wherein means are provided to adjust the tension of the tool when supported by the implement frame.

23. A tool element comprising a substantially U-shaped loop portion having a pair of arms and a base bridging the arms, and a pair of fingers each extending from the free end of a respective one of the arms of the loop portion, wherein the arms of each loop portion occupy a first common plane and the fingers extend in generally opposing directions at an obtuse angle to one another in a second common plane which is oblique to said first plane.

24. A tool element as claimed in claim 23 wherein each finger is provided with an abutting portion adjacent the loop portion.

* * * * *